(12) United States Patent
Chopping

(10) Patent No.: US 6,442,163 B1
(45) Date of Patent: Aug. 27, 2002

(54) DEPACKETIZER AND A FRAME ALIGNER INCLUDING THE DEPACKETIZER

(75) Inventor: Geoffrey Chopping, Wimborne (GB)

(73) Assignee: Marconi Communications Limited, Coventry (GB)

( * ) Notice: Subject to any disclaimer, the term of this patent is extended or adjusted under 35 U.S.C. 154(b) by 0 days.

(21) Appl. No.: 09/117,124

(22) PCT Filed: Jan. 17, 1997

(86) PCT No.: PCT/GB97/00163

§ 371 (c)(1),
(2), (4) Date: Sep. 3, 1998

(87) PCT Pub. No.: WO97/27684

PCT Pub. Date: Jul. 31, 1997

(30) Foreign Application Priority Data

Jan. 26, 1996 (GB) .............................................. 9601608
Dec. 24, 1996 (GB) .............................................. 9626849

(51) Int. Cl.[7] .............................................. H04Q 11/04
(52) U.S. Cl. .................... 370/395.1; 370/242; 370/389; 370/474; 370/503
(58) Field of Search ................................ 370/216, 242, 370/244, 252, 356, 389, 392, 394, 395, 465, 235, 395.1, 395.6, 395.61, 395.62, 474, 503, 506, 509

(56) References Cited

U.S. PATENT DOCUMENTS

| | | | | |
|---|---|---|---|---|
| 5,418,571 A | * | 5/1995 | Ghanbari | 348/416 |
| 5,426,643 A | | 6/1995 | Smolinske et al. | 370/105.3 |
| 5,481,536 A | | 1/1996 | Reisch et al. | 370/60.1 |
| 5,608,733 A | * | 3/1997 | Vallee et al. | 370/395 |
| 5,805,588 A | * | 9/1998 | Petersen | 370/395 |
| 6,208,618 B1 | * | 3/2001 | Kenney et al. | 370/392 |

FOREIGN PATENT DOCUMENTS

| | | | | |
|---|---|---|---|---|
| EP | 0743773 A2 | 11/1996 | | H04L/7/00 |
| WO | WO 95/22233 | 8/1995 | | H04Q/11/04 |

OTHER PUBLICATIONS

Electronics &Communications in Japan, Part I—Communications, vol. 76, No. 12, Dec. 1993, pp. 14–27, Hitoshi Eumatsu, et al, Cell Delay Variation Smoothing Methods for ATM–Based SDH Signal Transport System.

(List continued on next page.)

*Primary Examiner*—David Vincent
*Assistant Examiner*—Shick Hom
(74) *Attorney, Agent, or Firm*—Kirschstein, et al.

(57) ABSTRACT

A depacketizer is used in terminating an ATM multiplexed data stream at a functional unit, virtual channel data being carried in cells in the data stream. The depacketizer has a plurality of cell buffers each storing the data contained in a single cell and being loaded in the sequence of a message sequence number carried by each cell and emptied in accordance with a depacketizer algorithm to form a data stream. A fill-in cell format generator causes, on the failure of a valid cell to arrive, the replacement of the missing cell by a fill-in cell in the data stream. A time-out function generator is started after each cell has been depacketized and sometimes after fill-in replacement cells have been generated. A cell frame aligner has the depacketizer with a frame alignment signal detector which detects a frame alignment signal in the non-continuous data stream and generates an associated frame start signal and a loss of frame alignment signal as appropriate. A frame aligner accepts the non-continuous data stream and its associated frame start signal, except in the presence of a loss of frame alignment signal and aligns the non-continuous data stream to clock and frame start signals of the functional unit.

5 Claims, 8 Drawing Sheets

OTHER PUBLICATIONS

Proceedings of Communication Systems: Towards Global Integration, Singapore ICCS '90, Nov. 9, 1990, Singapore, pp. 8.6. 1–8. 6.5, Hessenmuller H., et al., A Survey of Synchronizaiton in a Broadband–ISDN Based on ATD.

Electronics & Communications in japan, Part I—Communications, vol. 77, No. 6, Jun. 1, 1994, pp. 1–15, Hiromi UEDA, et al., "SDH Signal Transfer Method Based on ATM Techniques".

Protocols for High–Speed Networks, II. Proceedings of the IFIP Wg 6.1., WG 6.4 Second International Workshop, Nov. 29, 1990, Palo Alto, USA, pp. 353–367, J. Escobar, et al., "A Proposed Segmentation and Re–Assembly (SAR) Protocol For Use With Asynchronous Transfer Mode (ATM)".

* cited by examiner

Fig.3.

| CONDITIONS | A | B | C | D | E |
|---|---|---|---|---|---|
| Cell (n+1) arrived | YES | YES | YES | NO | NO |
| Cell (n+2) arrived | YES | NO | NO | D/C | D/C |
| Time-out matured | D/C | YES | NO | D/C | YES |
| Cell Buffer has at least 2 full cells | YES | D/C | D/C | YES | NO |
| Cell Buffer has only 1 full cell | NO | D/C | D/C | NO | YES |
| Last condition cycle was E | D/C | D/C | YES | D/C | D/C |
| ACTIONS | | | | | |
| Depacketise Cell (n+1) | YES | YES | YES | NO | NO |
| Replace Cell (n+1) With Fill-in Cell | NO | NO | NO | YES | YES |
| Restart Time-out | YES | YES | YES | NO | YES |

D/C = Don't Care   N/A = Not Applicable

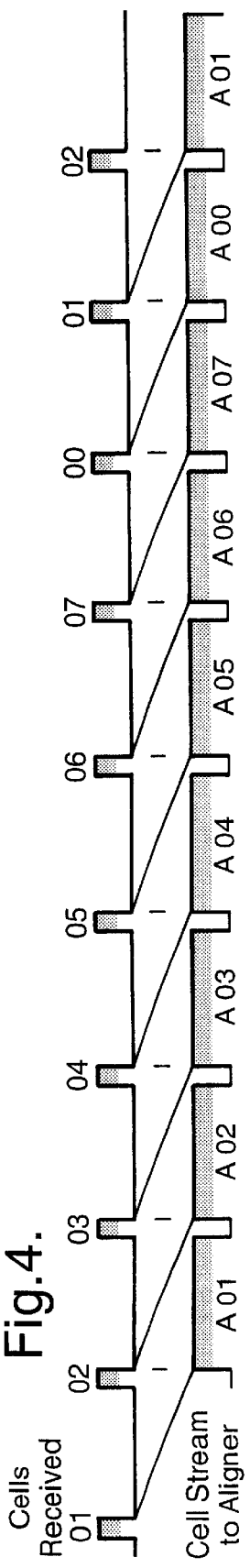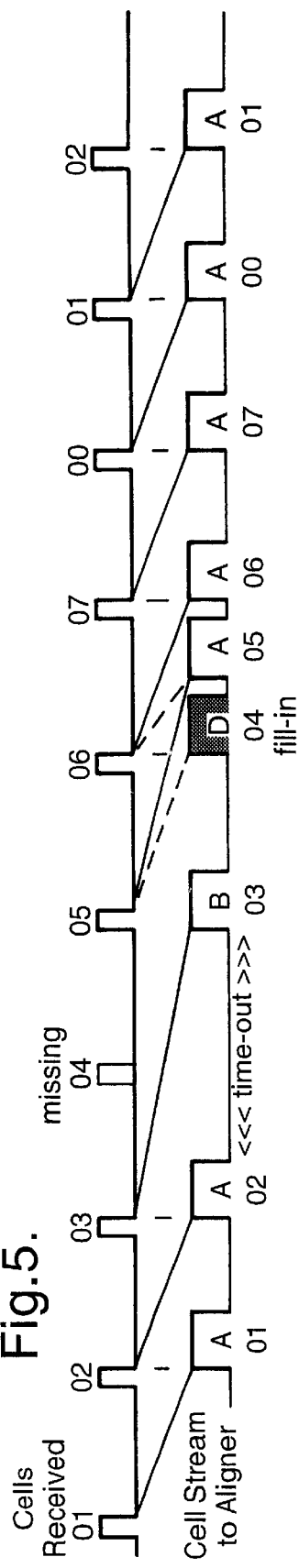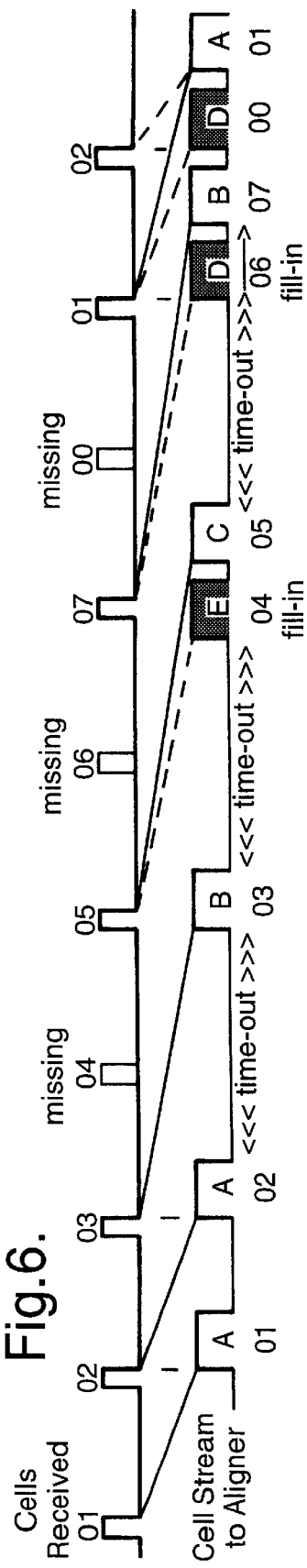

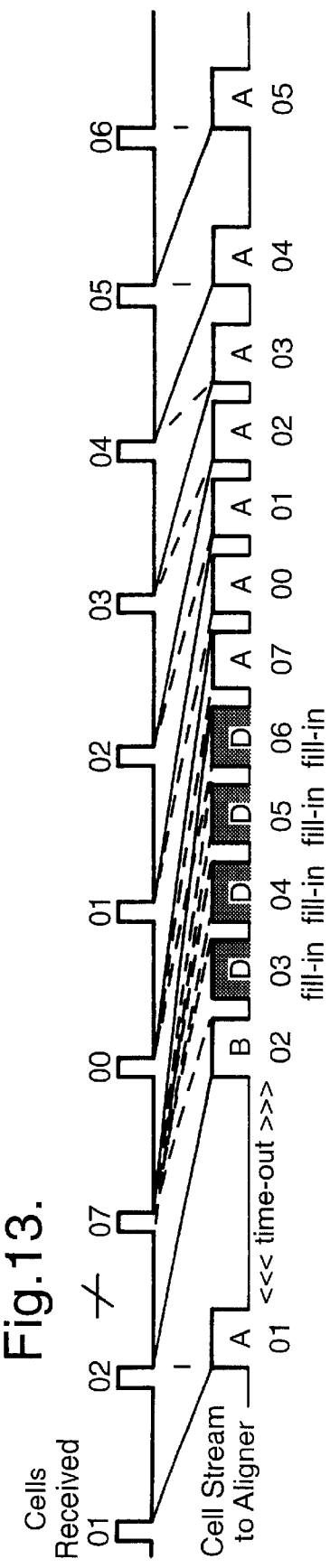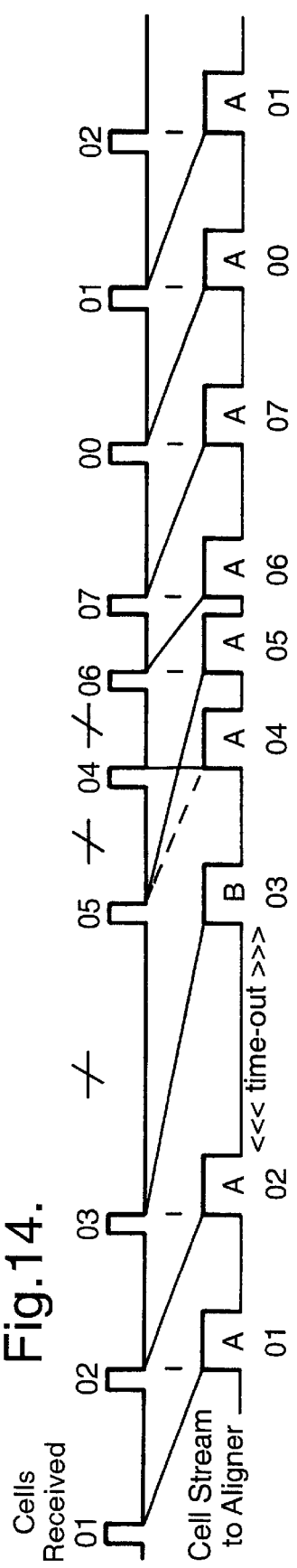

DEPACKETIZER AND A FRAME ALIGNER INCLUDING THE DEPACKETIZER

BACKGROUND OF THE INVENTION

Aligners have been used when terminating a synchronous multiplex, such as a framed 2048 kbit/s link, onto a functional unit, where the clock of the functional unit and the clock of the synchronous multiplex cannot be assumed to be of the same frequency and phase.

The use of aligners implies a synchronous service which will tolerate (although reluctantly) some slips. The design characteristic of an aligner is that if the limit of its buffering is reached then a controlled slip is performed. For a framed multiplex the slips usually equate to a frame of data, in which case the aligner is often referred to as a frame aligner. Aligners not only must be able to accept any phase of the incoming stream, but also must include sufficient hysteresis to cope with delay variations introduced by the network.

The use of frame aligners can also be extended to the termination of a framed multiplex carried in a Virtual Container by a Synchronous Digital Hierarchy (SDH) multiplex or the termination of a framed multiplex carried in a cell based Virtual Circuit by an Asynchronous Transfer Mode (ATM) multiplex, so that traffic of a nominal constant bit rate can be transferred from such multiplexes onto functional units which are expecting traffic of the same nominal constant bit rate. Such a functional unit could be a synchronous switch, or a digital to analogue to decoder, or in the case of ATM an asynchronous to synchronous adaptation function.

SDH traffic is characterised by being packed into columns with a percentage of stuffing. Asynchronous traffic is characterised by being carried in packets, frames or cells, cells being the term used commonly for ATM traffic. ATM cells are of a constant size and can carry a fixed amount of constant bit rate (CBR) traffic data.

When an aligner slips it must miss out a fixed amount of data if the traffic is arriving too quickly. If the traffic is arriving too slowly, then either a fixed amount of data is repeated or a fixed substitution set of data is inserted.

An example of a frame alignment detector was disclosed in Patent Number GB 2262417B, corresponding to U.S. Pat. No. 5,377,209.

Examples of frame aligners were disclosed in Patent Numbers GB 2063624A and GB 2151437A corresponding to U.S. Pat. No. 4,368,531 and U.S. Pat. No. 4,617,659 respectively. The aligner for the present application will require similar overall functional characteristics, but the hysteresis range will have to be substantially greater, perhaps in excess of a millisecond. The aligner also needs to have a slip limit adjusted when no cells have been received for some time and then to reject fill-in cells until frame alignment has been recovered.

SUMMARY OF THE INVENTION

Protocols for High-Speed Networks II—Proceedings of the IFIG WG 6.1, WG 6.4 Second International Workshop—Nov. 29, 1990, Palo Alto, USA, Pages 353–367 "A Proposed Segmentation and Re-Assembly (SAR) Protocol for Use with Asynchronous Transfer Mode (ATM)" describes where segmentation and reassembly of protocol data units into and from fixed-size cells in an Asynchronous Transfer Mode network is carried out by the Adaptation Layer of the network using Segmentation and Reassembly protocols. An experimental Segmentation and Reassembly protocol has been developed to be used with all desired Asynchronous Transfer mode services. The use of a single protocol for all services simplifies implementation and interoperability. Among its main characteristics, the protocol provides cell-based error correction and detection, a cell sequence number modulo 1024 to provide cell sequence integrity, and the ability for applications to insert control cells in the Asynchronous Transfer Mode cell stream.

According to the present invention there is provided where an Asynchronous Transfer Mode (ATM) multiplexed data stream is terminated at a functional unit, the virtual channel data being carried in cells in the data stream, a depacketiser comprising a plurality of cell buffers, each buffer storing the payload data contained in a single cell, the buffers being loaded in sequence in accordance with a message sequence number carried by each cell and emptied in accordance with a depacketiser algorithm to form a non-continuous data stream; a fill-in cell format generator which on the failure of a valid cell to arrive causes the replacement of the missing cell by a fill-in cell in the non-continuous data stream; a time-out function generator which is started after each cell has been depacketised and also after fill-in replacement cells have been generated except when the cell buffers have at least two full cells and at least two fill-in cells have been generated in succession.

There is also provided a cell frame aligner comprising a depacketiser as above and further comprising a frame alignment signal detector which detects a frame alignment signal in the non-continuous data stream and generates an associated frame start signal and a loss of frame alignment signal as appropriate; and a frame aligner which accepts the non-continuous data stream and its associated frame start signal, except in the presence of a loss of frame alignment signal, and aligns the non-continuous data stream to clock and frame start signals of the functional unit.

The algorithm which is used following the depacketisation of cell (n), or the generation of a fill-in cell to replace a missing cell (n), to determine when to depacketise the next cell buffer, or to supply a fill-in cell may be as follows: cell (n+1) is depacketised and the time-out cleared and restarted—if cell buffers (n+1) and (n+2) are full,—or if cell (n+1) is full and the time-out has matured,—or if cell (n+1) is full, the time-out has not matured and a fill-in cell has just been completed which cleared and restarted the time-out; cell (n+1) is replaced by a fill-in cell and the time-out is neither cleared nor restarted if cell buffer (n+1) is empty and there are at least 2 full cell buffers; cell (n+1) is replaced by a fill-in cell and the time-out is cleared and restarted if cell buffer (n+1) is empty, the time-out has matured and there is only one full cell buffer; if none of the preceding sets of conditions apply then no action is taken until one of them does apply.

The algorithm used to determine when to depacketise a full cell buffer, or to supply a fill-in cell to replace a missing cell, or to just wait is as follows:

When cell (n) has been emptied and the full/empty binary flat has been set to empty or the fill-in cell generator has completed the generation of a fill-in cell to replace a missing cell (n), then if one of the following sets of conditions applies then the specified action is taken: if one of the following sets of conditions does not apply then no action is taken until one of them does apply:

A If cell buffer (n+1) is full and cell buffer (n+2) is full: then the contents of the cell (n+1) are passed to the frame alignment signal detector and the aligner; and the time-out is cleared and restarted.

B If cell buffer (n+1) is full, cell buffer (n+2) is empty and the time-out has matured: then the contents of the cell (n+1) are passed to the frame alignment signal detector and the aligner; and the time-out is cleared and restarted.

C If cell buffer (n+1) is full, cell buffer (n+2) is empty, the time-out has not matured and the last condition cycle was a fill-in cell generated as a result of conditions for E applying: then the contents of the cell (n+1) are passed to the frame alignment signal detector and the aligner; and the time-out is cleared and restarted.

D If cell buffer (n+1) is empty and the depacketiser has at least 2 full cell buffers: then the cell (n+1) is declared as missing; the fill-in cell generator generates a fill-in cell which is passed to the frame alignment signal detector and the aligner; and the time-out is neither cleared nor restarted.

E It cell buffer (n+1) is empty, the time-out has matured and there is only one full cell buffer in the depacketiser: then the cell (n+1) is declared as missing; the fill-in cell generator generates a fill-in cell which is passed to the frame alignment signal detector and the aligner; and the time-out is cleared and restarted.

Because a byte of ATM data does not necessarily correspond to a time slot of a 2048 kbit/s framed multiplex, it is appropriate to pass the data from the depacketiser to the aligner and frame alignment signal detector as a clocked serial data stream, where the clock is not continuous, but a burst of 376 clock pulses and is followed by a variable length pause.

BRIEF DESCRIPTION OF THE DRAWINGS

The present invention will now be described, by way of example, with reference to the accompanying drawings, in which:

FIG. 3 shows a depacketiser algorithm table for carrying out the present invention;

FIGS. 4 to 17 show particular patterns of cell streams which arrive at a depacketiser and the corresponding cell stream which is sent to an aligner.

FIG. 4 shows a regular cell arrival stream at the depacketiser and the resultant cell stream to the aligner.

FIG. 5 shows a cell arrival stream at the depacketiser with one missing cell and the resultant cell stream to the aligner.

FIG. 6 shows a cell arrival stream at the depacketiser with three separate missing cells and the resultant cell stream to the aligner.

FIG. 7 shows a cell arrival stream at the depacketiser with two successive missing cells and the resultant cell stream to the aligner.

FIG. 8 shows a cell arrival stream at the depacketiser with three successive missing cells and the resultant cell stream to the aligner.

FIG. 9 shows a cell arrival stream at the depacketiser with four successive missing cells and the resultant cell stream to the aligner.

FIG. 10 shows a cell arrival stream at the depacketiser with some backward phase shifted cells and the resultant cell stream to the aligner.

FIG. 11 shows a cell arrival stream at the depacketiser with some forward phase shifted cells and the resultant cell stream to the aligner.

FIG. 12 shows a cell arrival stream at the depacketiser with several delayed cells and the resultant cell stream to the aligner.

FIG. 13 shows a cell arrival stream at the depacketiser with a discontinuity and the resultant cell stream to the aligner.

FIG. 14 shows a cell arrival stream at the depacketiser with some out of sequence cells and the resultant cell stream to the aligner.

FIG. 15 shows a cell arrival stream at the depacketiser with some extra cells and the resultant cell stream to the aligner.

FIG. 16 shows a cell arrival stream at the depacketiser with an extra cell and some backward phase shifted cells and the resultant cell stream to the aligner.

FIG. 17 shows a cell arrival stream at the depacketiser which is restarting after a long break and the resultant cell stream to the aligner.

DETAILED DESCRIPTION OF THE PREFERRED EMBODIMENTS

Figure 1:
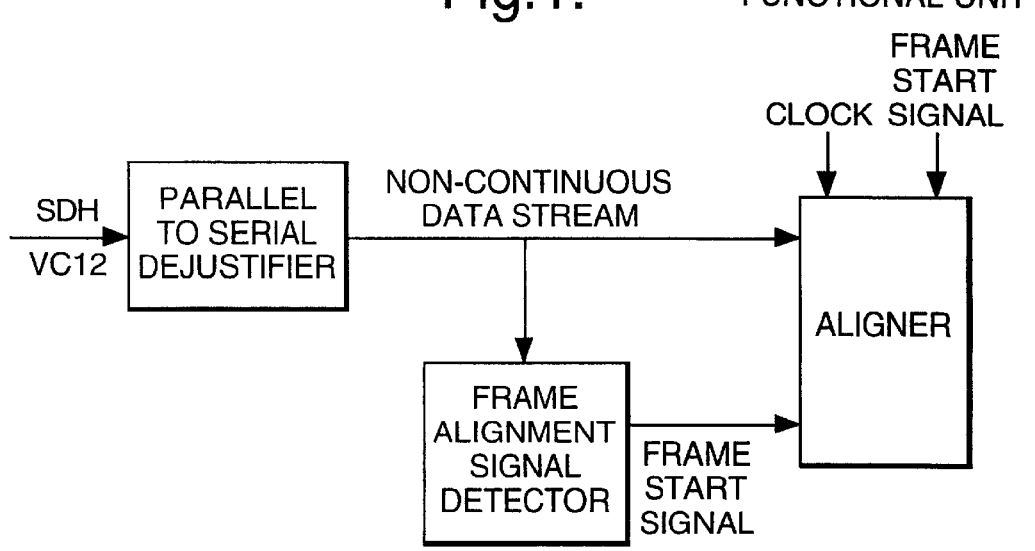
FIG. 1 shows a block diagram of a prior art SDH Frame Aligner.

FIG. 1 shows a block diagram of an SDH Frame Aligner having a parallel to serial dejustifier, connected to a frame alignment signal detector and an aligner, which are used for the normal operation.

As each byte of an SDH Virtual Container 12 (VC12) arrives the valid bits are extracted and sent as a data stream to the frame alignment signal detector and the aligner.

Figure 2:
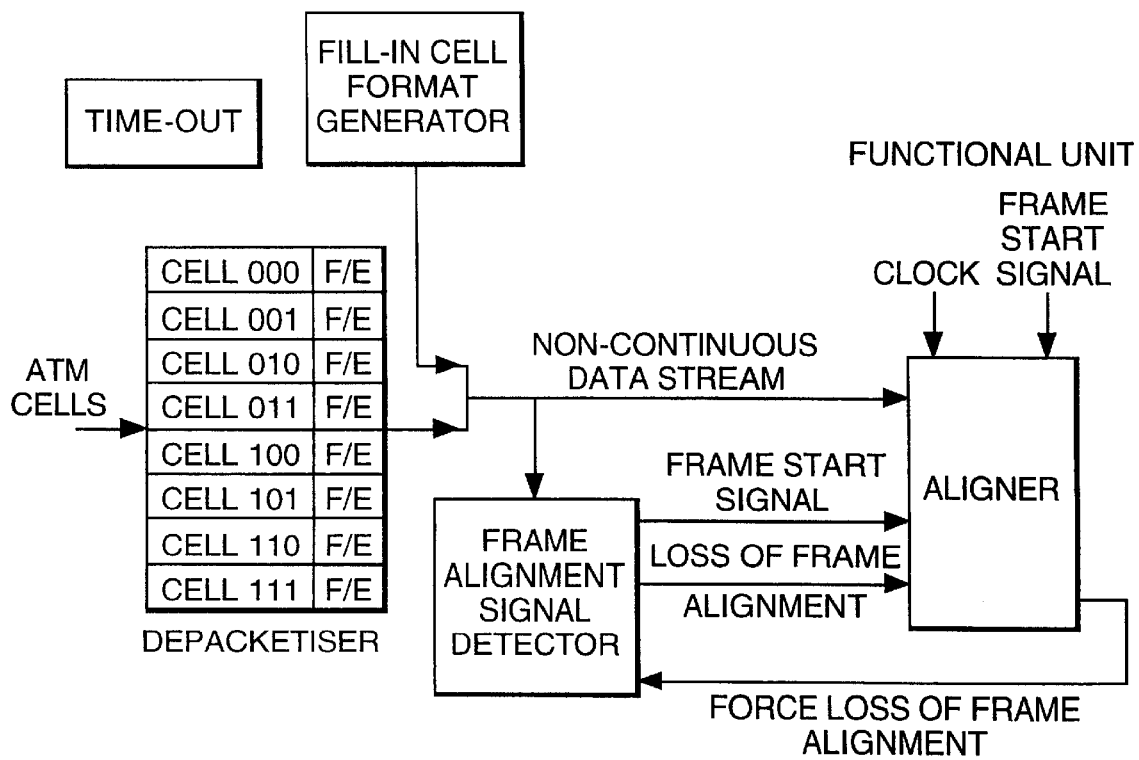
FIG. 2 shows a block diagram of an ATM Cell—Frame Aligner according to the present invention.

FIG. 2 shows a block diagram of an ATM Cell-Frame Aligner for 2 Mbit/s having a depacketiser connected to a frame alignment signal detector and an aligner, which are used for the normal operation.

When a cell arrives it is loaded into a depacketiser buffer. The depacketiser buffer has 8 cell buffers, but for a uniform arrival rate of cells normally only one or two cell buffers will contain any data.

It is arranged so that it takes less time to unpack a cell than the average value of the cell arrival period. The unpacked 47 bytes of the cell payload are sent in a burst to the frame alignment signal detector and aligner.

The depacketiser cell buffers are written to according to the message sequence number. This means they are normally written to in rotation.

There is no way of knowing initially whether the absence of a cell at the correct time is because it is late or because it is not going to come at all.

Declaring a cell as missing when it is only late would cause data loss. Consequently if the cell buffer for the next cell to be unpacked is empty, the cell should not normally be declared as missing until either the depacketiser contains at least two other full cell buffers, or the time-out has matured and the depacketiser contains one and only one other full cell buffer.

Each time a valid cell arrives it is loaded into the cell buffer defined by its message sequence number, unless that cell buffer is being emptied in which case the received cell is discarded.

The algorithm used to determine when to depacketise a full cell buffer, or to supply a fill-in cell to replace a missing cell, or to just wait is listed in the Algorithm table shown in FIG. 3. 3 conditions (A, B & C) are listed for depacketising and 2 conditions for supplying a fill-in cell (D & E).

When cell (n) has been emptied and the full/empty binary flag has been set to empty or the fill-in cell generator has completed the generation of a fill in cell to replace a missing cell (n), then if one of the sets of conditions shown in FIG. 3 applies then the specified action is taken; if none of the sets of conditions applies then no action is taken until one of them does apply.

The FIGS. 4 to 17 are examples of the operation of the depacketiser algorithm.

The reference letters A–E attached to the individual cells in the cell streams to the aligner indicate the relevant condition in the algorithm shown in FIG. 3.

FIG. 4 shows a regular stream of ATM cells of an ATM virtual circuit, which are arriving at the depacketiser. Each unpacked cell is only passed onto the aligner and frame alignment signal detector when the next cell has arrived, as defined by condition A of the algorithm.

For the convenience of illustration in FIGS. 5 to 17 the time to depacketise a cell is shown as being less than half the average arrival rate of the cells. A bit rate of 2430 kbit/s could be used by the SDH arrangement shown in FIG. 2 and it is also appropriate for ATM as used in FIG. 4. Some of the FIGS. 5 to 17 would be very long if such a value was used. The combined duration of the time-out plus the unpacking time for a cell in these Figures is shown as being equal to just under twice the average arrival rate of the cells. This combined duration is appropriate for a depacketiser.

FIG. 5 shows cell 04 as being missing. Once the time-out has matured, cell 03 can be unpacked according to condition B of the algorithm. Cell 04 is not assumed to be missing until cells 05 and 06 are in the depacketiser cell buffers and then a fill-in replacement cell is sent according to condition D of the algorithm.

FIG. 6 shows three missing cells 04, 06 and 00 with valid cells 05 and 07 between the missing cells. All condition cycles A, B, C, D and E are shown in this figure. Cell 03 is unpacked before according to condition B, but Cell 04 is not assumed to be missing until cell 05 has arrived and the time-out has matured for condition E. Cell 05 is then unpacked according to condition C, which is only applicable after a condition E cycle. The time-out does not quite reach maturity before cell 01 arrives so the fill-in cell is generated as a result of conditions for D being fulfilled. As the time-out matures during the fill-in cell 06, cell 07 can immediately be unpacked according to a condition cycle B. This is followed by another fill-in condition D cycle for missing cell 00 and then cell 01 is unpacked with a condition A cycle.

Figure 7:
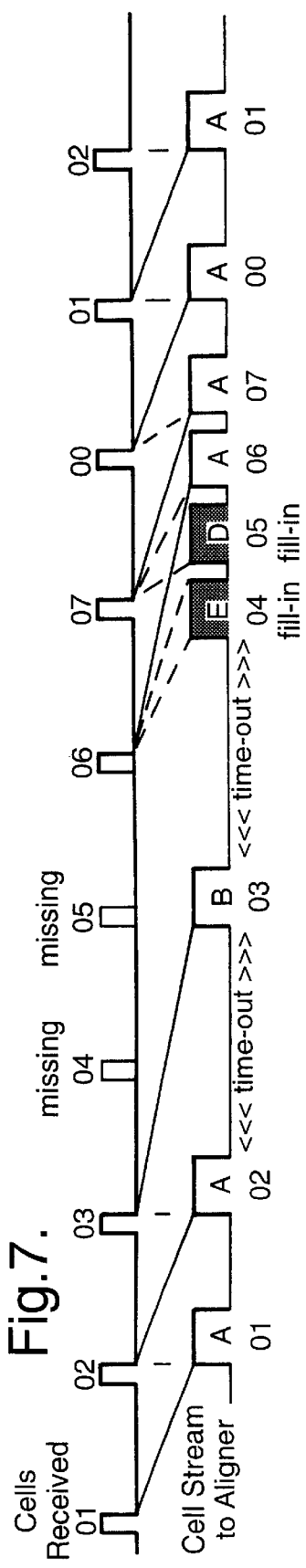

FIG. 7 shows two successive missing cells 04 and 05. Consequently when cell 06 arrives and the time-out has matured a fill-in condition cycle E occurs followed by a condition cycle D as cell 07 has then arrived.

Figure 8:
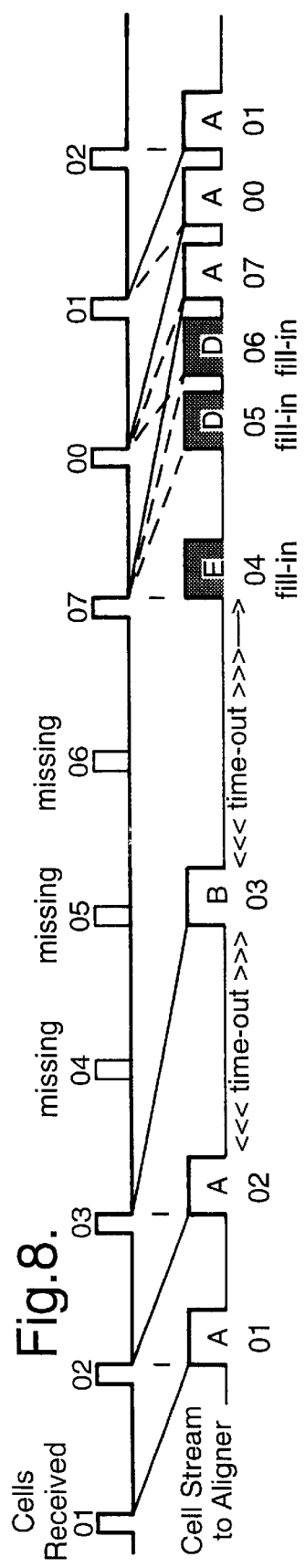

FIG. 8 shows three successive missing cells 04, 05 and 06. Consequently when cell 07 arrives after the time-out has matured a fill-in condition cycle E occurs. This is followed by 2 condition D fill-in cell cycles when cell 00 arrives. Three successive missing cells lose 141 bytes and gives approximately a 0.2 probability of a loss of frame alignment for a 2048 kbit/s link formatted in accordance with CCIT recommendation G.704.

Figure 9:
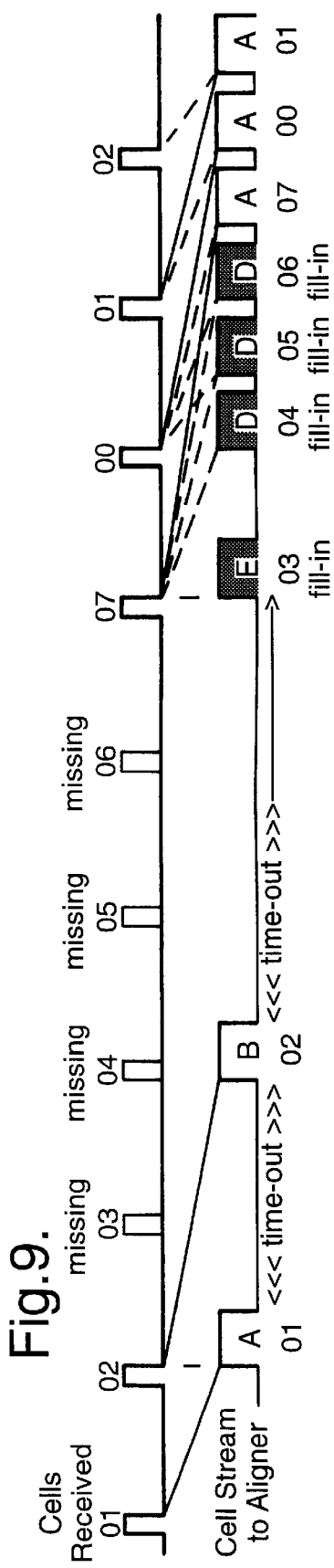

FIG. 9 shows four successive missing cells 03, 04, 05 and 06. Consequently when cell 07 arrives after the time-out has matured a fill-in condition cycle E occurs. This is followed by 3 condition D fill-in cell cycles when cell 00 arrives. This will with 0.92 probability lead to the frame alignment signal detector reporting a loss of frame alignment.

Figure 10:
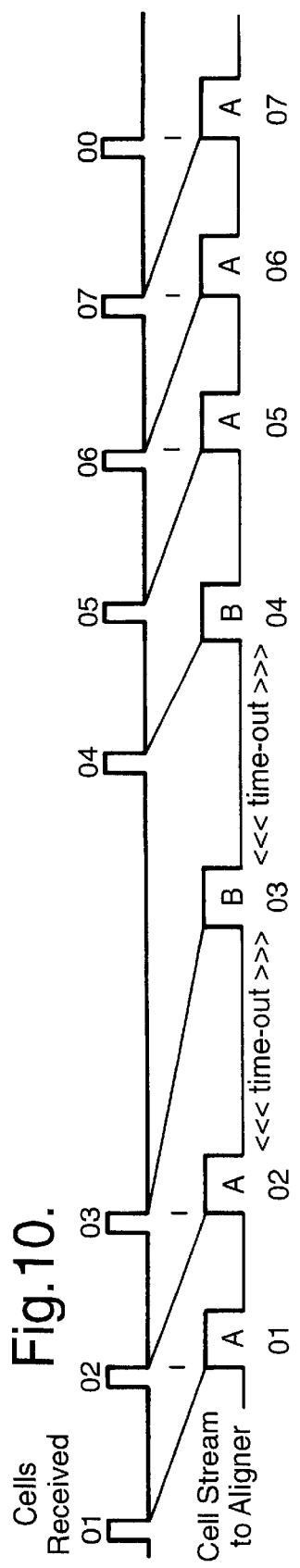

FIG. 10 shows a received cell stream which has a significant backward phase shift but no cell loss. The time-out matures twice in the sequence shown resulting in 2 cells being depacketised as a result of condition B applying, without any fill-in cells being required.

Figure 11:
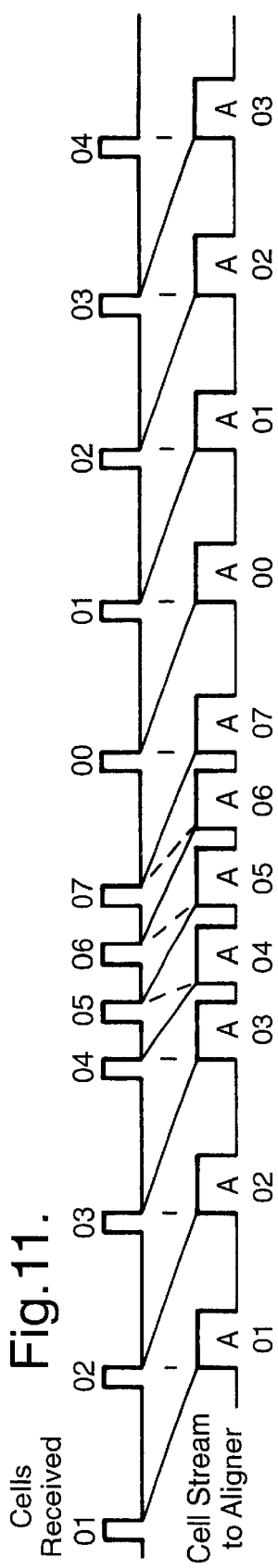

FIG. 11 shows a received cell stream with an opposite phase shift which enables condition A to apply throughout.

Figure 12:
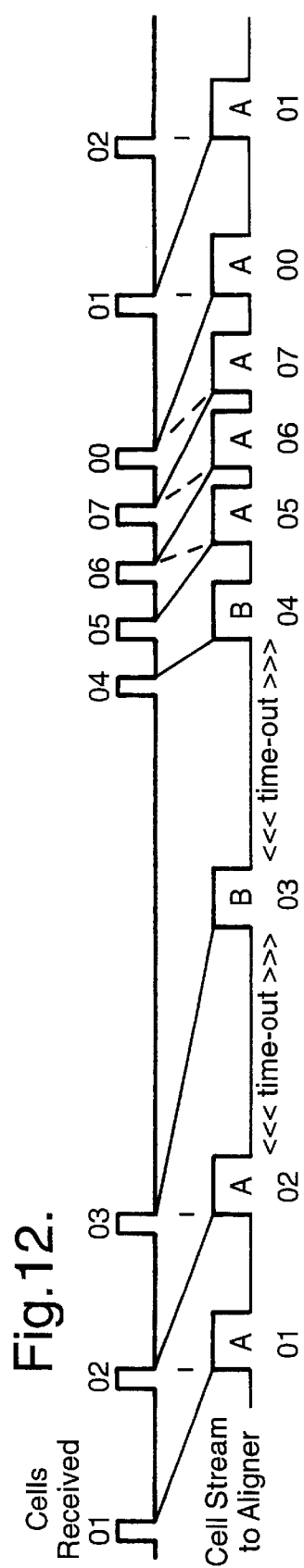

FIG. 12 is a combination of the phase shifts of the previous two figures and results in both condition A and condition B applying, but again with no fill-in cells being required.

FIG. 13 has a regular arrival of cells, but after cell 02 the message sequence number jumps by 5 not 1. The algorithm results in a similar decision sequence to that used in FIG. 9, which showed 4 successive missing cells and resulted in 4 fill-in cells. Such a sequence could result from a switching action in the network resulting in a different cell stream being received.

Figure 15:
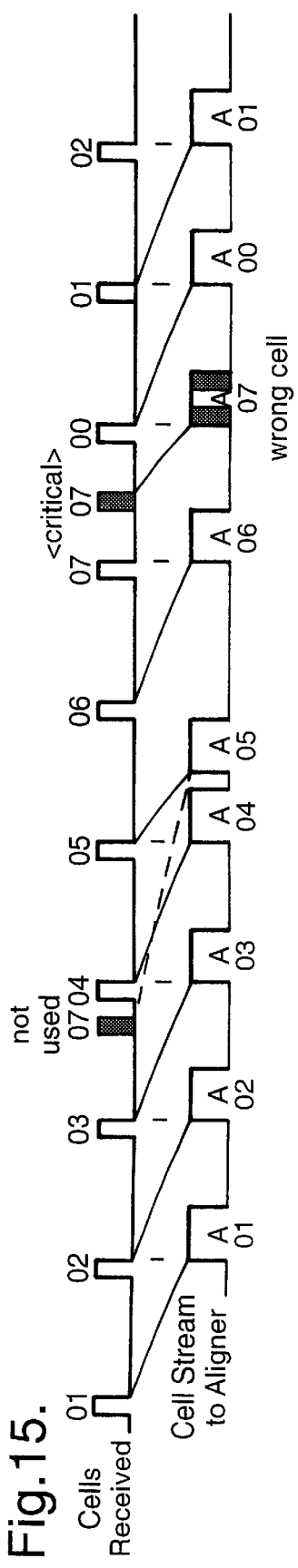

FIG. 14 has a sequence where cell 04 has arrived after cell 05. The algorithm copes with this arrangement. Cell 03 is unpacked after the time-out has matured according to condition B. When the next two cells, 05 and 04, have arrived condition A appliesand cell 04 is unpacked. By waiting for 2 cells to arrive considerable protection against declaring cell 04 as missing is achieved, because extra cells may be received because of network: faults FIG. 15 shows some extra cells, all with the message seqquence number 07. Although all the cells with the message sequence number 07 are accepted into the depacketising buffer, it is only the extra cell that arrives between the true cell 07 and cell 00 that will be used. The effect is that the real cell 07 is replaced by the extra cell 07, however the sequence to the aligner and the frame alignment signal detector is still maintained so that neither a slip nor loss of frame alignment should occur. An extra cell can mean that a cell is depacketised earlier than normal.

Figure 16:
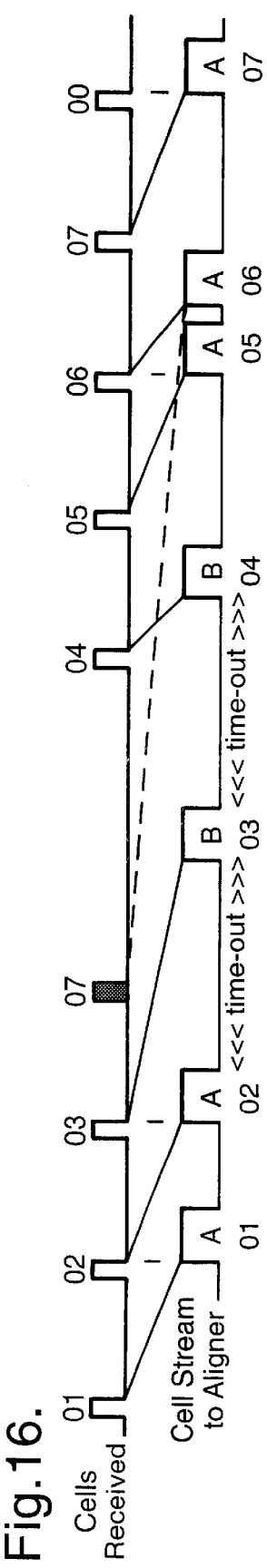

FIG. 16 shows an extra cell and a phase shift sufficient to make the time-out mature twice. However as a fill-in cell is not generated until two extra cells arrive, or one extra cell arrives and the time-out matures twice without the correct cell arriving, considerable protection is provided by the algorithm against errored sequences.

Figure 17:
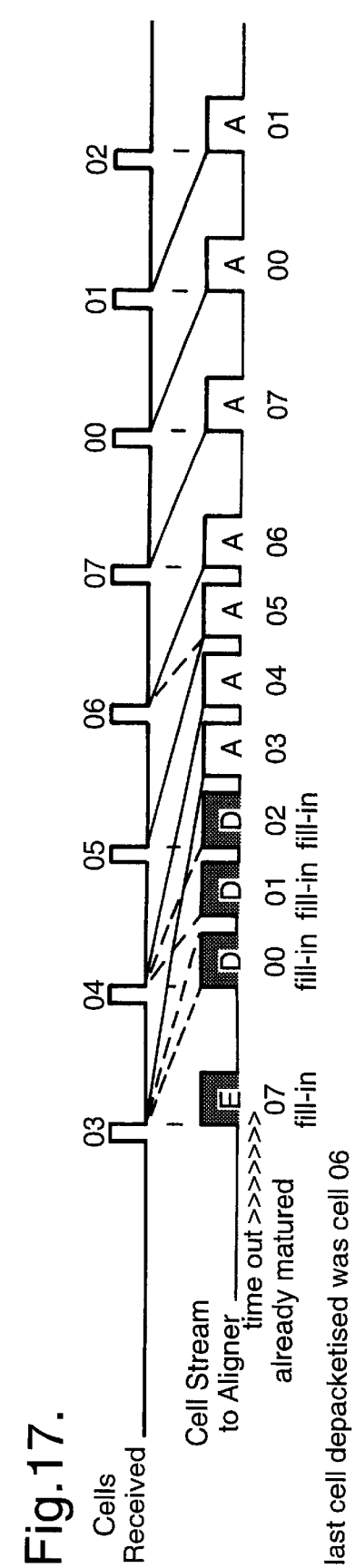

FIG. 17 shows no cells being received and then cells starting to be received once again. The message sequence numbers of the last cell to have been depacketised before the break and first cell to arrive after the break will determine the number of fill-in cells that are generated before Condition A applies and depacketised cells start being sent to the aligner and frame alignment signal detector.

The algorithm avoids inserting fill-in cells when they are not needed, so that the algorithm stops forwarding cells if no cells are being received. This means that if no cells have been received for some time the aligner is empty and slipping.

Once the aligner has not been receiving any cells and has performed several successive slips, e.g. 8 successive slips, then the normal empty slip point is moved to the start-up empty slip point until depacketised cells, not fill-in cells, are received again by the aligner.

Figure 18:
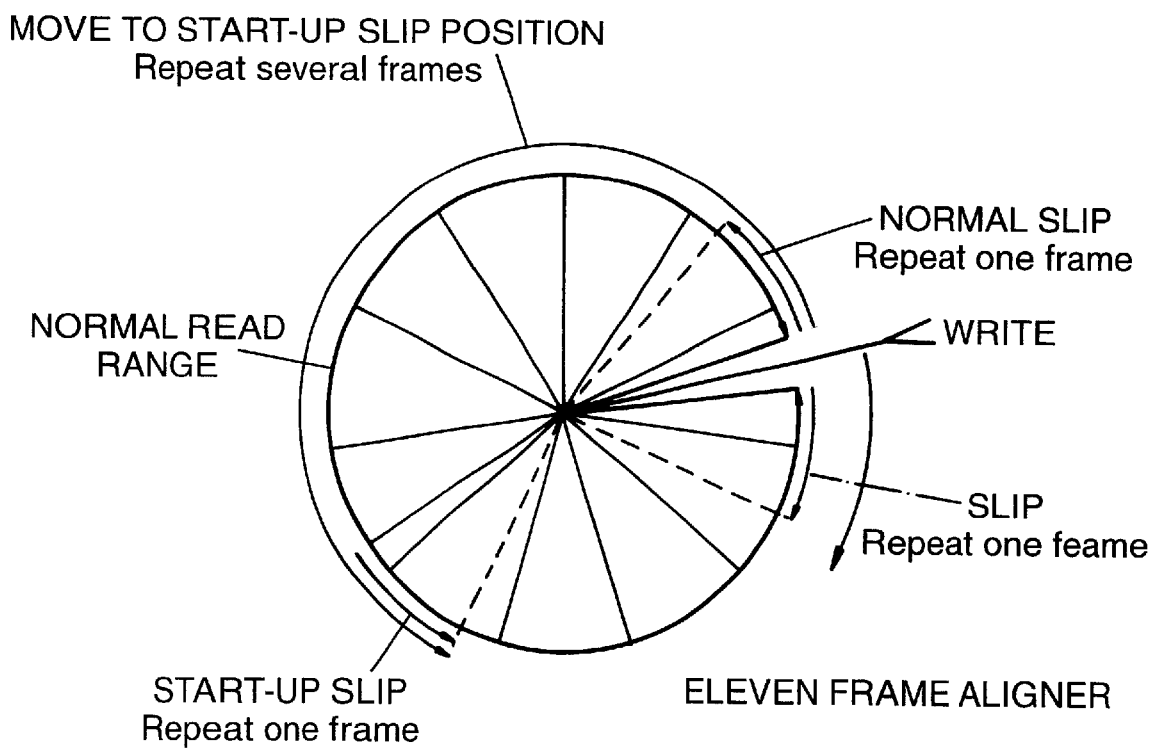
FIG. 18 shows an aligner slip decision diagram suitable for an aligner working in conjunction with the depacketiser algorithm.

FIG. 18 shows the slip points for such an aligner, the start up slip point being towards the full end of the range as cell arrivals are more likely to be low delay rather than high delay when the depacketiser starts to receive cells again.

Because of the possibility of there being a bunch of fill-in cells when the cells are received again by the aligner as shown in FIG. 17, the aligner takes the following protection measures when it detects several successive slips:

moves the slip decision point for repeating one frame to the start-up slip position;

forces the frame alignment signal detector to lose frame alignment so that it starts searching again for the frame alignment signal;

ignores all fill-in cells from the depacketiser until frame alignment is recovered;

returns the slip decision point for repeating one frame to its normal position when frame alignment is recovered.

The aligner normally slips by a frame of 32 time slots and a slip can start at any time slot boundary.

I claim:

1. In terminating an Asynchronous Transfer Mode (ATM) multiplexed data stream at a functional unit, virtual channel payload data being carried in cells in the data stream, a depacketizer comprising:

a) a plurality of cell buffers, each buffer storing the virtual channel payload data contained in a single cell, the buffers being loaded in sequence in accordance with a message sequence number carried by each cell and emptied in accordance with a depacketizer algorithm to form a non-continuous data stream;

b) a fill-in cell format generator which, on the failure of a valid cell to arrive creating a missing cell, causes the replacement of the missing cell by a fill-in cell in the non-continuous data stream; and c) a time-out function generator which is started after each cell has been depacketized and also after fill-in replacement cells have been generated, except when the cell buffers have at least two full cells and at least two fill-in cells have been generated in succession.

2. The depacketizer as claimed in claim 1, wherein the algorithm used following the depacketization of cell (n), or the generation of the fill-in cell to replace the missing cell (n), to determine when to depacketize a next cell buffer, or to supply the fill-in cell is as follows: cell (n+1) is depacketized and a time-out cleared and restarted—if cell buffers (n+1) and (n+2) are full,—or if cell (n+1) is full and the time-out has matured,—or if cell (n+1) is full, the time-out has not matured and the fill-in cell has just been completed which cleared and restarted the time-out; cell (n+1) is replaced by the fill-in cell and the time-out is neither cleared nor restarted if cell buffer (n+1) is empty and there are at least 2 full cell buffers; cell (n+1) is replaced by the fill-in cell and the time-out is cleared and restarted if cell buffer (n+1) is empty, the time-out has matured and there is only one full cell buffer; and if none of the preceding sets of conditions apply, then no action is taken until one of them does apply.

3. The depacketizer as claimed in claim 1, wherein a number of cell buffers in the depacketizer equals a range of the message sequence number.

4. A cell frame aligner, comprising:

a) a depacketizer including i) a plurality of cell buffers, each buffer storing virtual channel payload data contained in a single cell, the buffers being loaded in sequence in accordance with a message sequence number carried by each cell and emptied in accordance with a depacketizer algorithm to form a non-continuous data stream;

ii) a fill-in cell format generator which, on the failure of a valid cell to arrive creating a missing cell, causes the replacement of the missing cell by a fill-in cell in the non-continuous data stream; and iii) a time-out function generator which is started after each cell has been depacketized and also after fill-in replacement cells have been generated, except when the cell buffers have at least two full cells and at least two fill-in cells have been generated in succession;

b) a frame alignment signal detector which detects a frame alignment signal in the non-continuous data stream and generates an associated frame start signal and a loss of frame alignment signal as appropriate; and c) a frame aligner which accepts the non-continuous data stream and its associated frame start signal, except in the presence of a loss of frame alignment signal, and aligns the non-continuous data stream to clock and frame start signals of a functional unit.

5. The cell-frame aligner as claimed in claim 4, wherein the aligner when it detects several successive slips: moves its normal slip decision point for repeating one frame to a start-up slip position; forces the frame alignment signal detector to lose frame alignment so that the frame alignment signal detector starts searching again for the frame alignment signal; ignores all the fill-in cells from the depacketizer until frame alignment is recovered; and returns the slip decision point for repeating one frame to its normal position when the frame alignment is recovered.

* * * * *